US008478986B2

(12) United States Patent
Merugu et al.

(10) Patent No.: US 8,478,986 B2
(45) Date of Patent: Jul. 2, 2013

(54) REDUCING LATENCY OF SPLIT-TERMINATED SECURE COMMUNICATION PROTOCOL SESSIONS

(75) Inventors: Shashidhar Merugu, Mountain View, CA (US); Case Thomas Larsen, Union City, CA (US); Naveen Maveli, Sunnyvale, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 1112 days.

(21) Appl. No.: 12/327,693

(22) Filed: Dec. 3, 2008

(65) Prior Publication Data
US 2009/0083538 A1 Mar. 26, 2009

Related U.S. Application Data

(63) Continuation-in-part of application No. 11/489,414, filed on Jul. 18, 2006.

(60) Provisional application No. 60/992,071, filed on Dec. 3, 2007, provisional application No. 60/707,804, filed on Aug. 10, 2005.

(51) Int. Cl.
*H04L 29/06* (2006.01)

(52) U.S. Cl.
USPC .......................................... 713/153; 713/171

(58) Field of Classification Search
None
See application file for complete search history.

(56) References Cited

U.S. PATENT DOCUMENTS

| 6,094,485 A | 7/2000 | Weinstein et al. |
| 6,104,716 A | 8/2000 | Crichton et al. |
| 6,105,067 A | 8/2000 | Batra |
| 6,526,131 B1 * | 2/2003 | Zimmerman et al. ... 379/106.09 |
| 6,584,567 B1 * | 6/2003 | Bellwood et al. ............. 713/171 |

(Continued)

FOREIGN PATENT DOCUMENTS

| EP | 1533982 A2 | 5/2005 |
| WO | 0103398 A2 | 1/2001 |
| WO | 0137068 A2 | 5/2001 |
| WO | 2005060202 A1 | 6/2005 |

OTHER PUBLICATIONS

Dierks, T., et al., "The Transport Layer Security (TLS) Protocol Version 1.2", pp. 1-98, Networking Working Group, http://www.ietf.org/rfc/rfc5246.txt, downloaded Dec. 16, 2008.

(Continued)

*Primary Examiner* — Nadia Khoshnoodi
(74) *Attorney, Agent, or Firm* — Park, Vaughan, Fleming & Dowler, LLP (57) ABSTRACT

A method is provided for establishing a split-terminated secure communication connection between a client and a server. A first network intermediary intercepts a secure communication connection request directed from the client to the server. A second intermediary having a digital certificate in the name of the server (and a corresponding private key) acts in place of the server to establish a first secure communication session with the client, during which it receives a secret from the client for generating the session key. The second intermediary supplies the secret and/or the session key to the first intermediary, which allows the first intermediary to establish follow-on secure communication sessions in which the secret is reused. The second intermediary may also supply the first intermediary with a copy of its certificate so that it can respond to new secure communication requests and, yet further, may also supply a copy of the private key.

12 Claims, 5 Drawing Sheets

U.S. PATENT DOCUMENTS

| | | |
|---|---|---|
| 6,643,701 B1 | 11/2003 | Aziz et al. |
| 6,658,114 B1 | 12/2003 | Farn et al. |
| 6,681,327 B1 | 1/2004 | Jardin |
| 6,704,798 B1 | 3/2004 | Mogul |
| 6,728,884 B1 | 4/2004 | Lim |
| 6,799,270 B1 | 9/2004 | Bull et al. |
| 6,918,041 B1 | 7/2005 | Chen |
| 6,996,841 B2 | 2/2006 | Kadyk et al. |
| 7,007,163 B2 | 2/2006 | Tardo et al. |
| 7,010,608 B2 | 3/2006 | Garg et al. |
| 7,073,066 B1 | 7/2006 | Nessett |
| 7,082,535 B1 | 7/2006 | Norman et al. |
| 7,120,666 B2 | 10/2006 | McCanne et al. |
| 7,146,505 B1 | 12/2006 | Harada et al. |
| 7,174,565 B2 | 2/2007 | Kadyk et al. |
| 7,219,120 B2 | 5/2007 | Hui |
| 7,240,366 B2 | 7/2007 | Buch et al. |
| 7,343,398 B1 | 3/2008 | Lownsbrough |
| 7,370,351 B1 | 5/2008 | Ramachandran et al. |
| 7,401,159 B1 | 7/2008 | Aviani et al. |
| 7,421,735 B2 | 9/2008 | Kerstens et al. |
| 7,502,726 B2 | 3/2009 | Panasyuk et al. |
| 7,506,369 B2 | 3/2009 | Buch et al. |
| 7,543,146 B1 | 6/2009 | Karandikar et al. |
| 7,568,114 B1 | 7/2009 | Schlafly |
| 7,647,404 B2 | 1/2010 | Cooper et al. |
| 7,661,131 B1 | 2/2010 | Shaw et al. |
| 7,770,007 B2 | 8/2010 | Bobde et al. |
| 7,827,405 B2 | 11/2010 | Christiansen et al. |
| 7,853,699 B2 | 12/2010 | Wu et al. |
| 7,865,720 B2 | 1/2011 | Little et al. |
| 7,895,446 B2 | 2/2011 | Harada et al. |
| 7,904,949 B2 | 3/2011 | Bowers et al. |
| 7,958,347 B1 | 6/2011 | Ferguson |
| 7,979,555 B2 | 7/2011 | Rothstein et al. |
| 7,984,160 B2 | 7/2011 | Lam |
| 7,996,886 B1 | 8/2011 | Hughes et al. |
| 8,020,201 B2 | 9/2011 | Adusumilli et al. |
| 8,176,186 B2 | 5/2012 | McCanne et al. |
| 8,266,452 B2 | 9/2012 | Dunn et al. |
| 2001/0047474 A1 | 11/2001 | Takagi et al. |
| 2002/0016911 A1 | 2/2002 | Chawla et al. |
| 2002/0023145 A1 | 2/2002 | Orr et al. |
| 2002/0035681 A1 | 3/2002 | Maturana et al. |
| 2002/0069241 A1 | 6/2002 | Narlikar et al. |
| 2002/0157019 A1* | 10/2002 | Kadyk et al. ............... 713/201 |
| 2002/0163884 A1 | 11/2002 | Peles et al. |
| 2002/0165928 A1 | 11/2002 | Landfeldt et al. |
| 2003/0005280 A1 | 1/2003 | Bobde et al. |
| 2003/0014628 A1 | 1/2003 | Freed et al. |
| 2003/0014650 A1 | 1/2003 | Freed et al. |
| 2003/0105810 A1 | 6/2003 | McCrory et al. |
| 2003/0196084 A1 | 10/2003 | Okereke et al. |
| 2003/0200332 A1 | 10/2003 | Gupta et al. |
| 2003/0233539 A1 | 12/2003 | Tardo et al. |
| 2004/0010596 A1* | 1/2004 | Hui ........................... 709/228 |
| 2004/0015725 A1 | 1/2004 | Boneh et al. |
| 2004/0088542 A1 | 5/2004 | Daude et al. |
| 2004/0243703 A1 | 12/2004 | Demmer et al. |
| 2005/0001660 A1 | 1/2005 | Roy |
| 2005/0008158 A1 | 1/2005 | Huh et al. |
| 2005/0021956 A1 | 1/2005 | Genty et al. |
| 2005/0050316 A1 | 3/2005 | Peles |
| 2005/0060426 A1 | 3/2005 | Samuels et al. |
| 2005/0065799 A1 | 3/2005 | Dare et al. |
| 2005/0081029 A1 | 4/2005 | Thornton et al. |
| 2005/0108517 A1 | 5/2005 | Dillon et al. |
| 2005/0138353 A1 | 6/2005 | Spies et al. |
| 2005/0138359 A1 | 6/2005 | Simon et al. |
| 2005/0144463 A1 | 6/2005 | Rossebo et al. |
| 2005/0240777 A1 | 10/2005 | Keohane et al. |
| 2005/0265327 A1 | 12/2005 | Buch et al. |
| 2006/0069719 A1 | 3/2006 | McCanne et al. |
| 2006/0143702 A1 | 6/2006 | Hisada et al. |
| 2006/0168210 A1 | 7/2006 | Ahonen et al. |
| 2006/0174106 A1 | 8/2006 | Bell et al. |
| 2006/0190612 A1 | 8/2006 | Kahol et al. |
| 2006/0209789 A1 | 9/2006 | Gupta et al. |
| 2007/0038853 A1 | 2/2007 | Larsen et al. |
| 2007/0058807 A1 | 3/2007 | Marsh |
| 2007/0074282 A1* | 3/2007 | Black et al. ................ 726/14 |
| 2007/0199061 A1 | 8/2007 | Byres et al. |
| 2008/0046714 A1 | 2/2008 | Suganthi et al. |
| 2008/0060055 A1 | 3/2008 | Lau |
| 2008/0077982 A1 | 3/2008 | Hayler et al. |
| 2008/0115200 A1 | 5/2008 | Olson et al. |
| 2008/0126794 A1 | 5/2008 | Wang et al. |
| 2008/0126801 A1 | 5/2008 | Lee et al. |
| 2008/0263215 A1 | 10/2008 | Schnellbaecher |
| 2008/0307219 A1 | 12/2008 | Karandikar |
| 2009/0013399 A1 | 1/2009 | Cottrell et al. |
| 2009/0083537 A1 | 3/2009 | Larsen et al. |
| 2009/0083538 A1 | 3/2009 | Merugu et al. |
| 2009/0089862 A1 | 4/2009 | Sun |
| 2009/0113537 A1 | 4/2009 | Woo |
| 2009/0119504 A1 | 5/2009 | Van Os et al. |
| 2009/0220080 A1 | 9/2009 | Herne et al. |
| 2010/0031337 A1 | 2/2010 | Black et al. |
| 2010/0049970 A1 | 2/2010 | Fraleigh et al. |
| 2010/0071048 A1 | 3/2010 | Novak et al. |

OTHER PUBLICATIONS

Dierks et al., "The Transport Layer Security (TLS) Protocol Version 1.2", Network Working Group Request for Comments: 5246 (Aug. 2008).

Tschalar, Ronald et al., "NTLM Authentication Scheme for HTTP", Jun. 17, 2003, http://www.innovation.ch/personal/ronald/ntlm.html, pp. 1-5, downloaded Jan. 20, 2009.

"Kerberos: The Network Authentication Protocol", http://web.mit.edu/Kerberos/, pp. 1-3, downloaded Jan. 20, 2009.

"Microsoft NTLM", http://msdn.microsoft.com/en-us/library/aa378749.aspx, pp. 1-2, downloaded Jan. 20, 2009.

"NTLM", http://en.wikipedia.org/wiki/NTLM, pp. 1-5, downloaded Jan. 20, 2009.

"Kerberos (protocol)", http://en.wikipedia.org/wiki/Kerberos_(protocol), pp. 1-5, downloaded Jan. 20, 2009.

"The Industry Insiders", http://blogs.technet.com/industry_insiders/articles/407751.aspx, downloaded Jan. 20, 2009.

Christensen, Jesper M, "Kerberos in a Sharepoint Environment", Jul. 30, 2008, http://www.windowsecurity.com/articles/Kerberos-Sharepoint-Environment.html, pp. 1-13, downloaded Jan. 20, 2009.

"The NTLM Authentication Protocol and Security Support Provider", http://davenport.sourceforge.net/ntlm.html, pp. 1-93, downloaded Jan. 21, 2009.

"Integrated Windows Authentication (IIS 6.0)", http://microsoft.com/technet/prodtechnol/WindowsServer2003/Library/IIS/523ae943-5e6a-4200-9103-9808baa00157.mspx?mfr=true, pp. 1-2, downloaded Jan. 21, 2009.

* cited by examiner

FIG. 1

FIG. 2  FULL Handshake Process 200

REDUCING LATENCY OF SPLIT-TERMINATED SECURE COMMUNICATION PROTOCOL SESSIONS

RELATED APPLICATIONS

The present application claims priority to U.S. Provisional Patent Application No. 60/992,071, which was filed Dec. 3, 2007, is entitled "Reducing Latency of Split-Terminated Secure Communication Protocol Sessions," and which is incorporated herein by reference. In addition, the present application is a continuation-in-part of U.S. patent application Ser. No. 11/489,414, which was filed Jul. 18, 2006 and is also incorporated herein by reference, and which claims priority to U.S. Provisional Patent Application No. 60/707,804, filed Aug. 10, 2005.

FIELD

The present invention relates to network optimization in general, and in particular to accelerating network transactions including data conveyed using secure communications protocols.

BACKGROUND

Protocols that use either or both public-key cryptographic techniques and symmetric-key cryptographic techniques are often used to establish secure communications across an untrusted network or other communication link. Typically, public-key cryptography has better security properties but is more expensive computationally than symmetric-key cryptography. Thus, the two types of cryptography may be combined to use public-key techniques to negotiate a symmetric cipher between two entities. The symmetric-key cipher may then be used for bulk data transfer between the entities. Secure Socket Layer (SSL) and Transport Layer Security (TLS) are widely-used examples of secure communication protocols that have this form, as well as IPSec (Internet Protocol Security) when security associations are negotiated using RSA-based (Rivest, Shamir & Adleman) mechanisms for IKE (Internet (or IPsec) Key Exchange).

Secure communication protocols often add a computational cost to each secured connection. For server computers providing many simultaneous secure connections to client computers, the additional computational overhead imposed by secure communication protocols can be significant. To decrease the computational overhead of secure communication protocols for computers providing large numbers of secure connections, there are various devices that specialize in terminating secure connections. These secure connection termination devices manage the cryptographic and other security related aspects of the connection, thereby relieving server systems providing services to client systems of the additional overhead imposed by the secure connection. In general, these secure connection termination devices appear to client systems as servers providing secure connections.

A secure connection termination device is configured in much the same way as a server that supports secure communication protocols, including, for example, private keys, public keys and security certificates. From a security perspective, a secure connection termination device is identical to a server and therefore should be protected identically. If the security of a secure connection termination device is compromised, for example by the loss of a server's private key, attackers would be able to set up a fake server that would be trusted by client systems that use the secure communication protocol.

A transaction accelerator such as that described in U.S. Pat. No. 7,120,666 (McCanne) can offer performance improvement for operations across a wide-area network (WAN), but only when the data being communicated is either intelligible (i.e., the transaction accelerator can interpret at least parts of the protocol) or repeating (i.e., identical data crosses the network in identical format). The use of secure communication protocols such as SSL and TLS thus typically frustrates transaction acceleration, because cryptography (by design) renders encrypted data unintelligible and non-repeating.

A method of securing end-to-end communications between a client and a server separated by transaction accelerators is described in U.S. Patent Publication No. US2007/0038853 (application Ser. No. 11/489,414), and involves the use of separate split-terminated secure protocol sessions between a transaction accelerator and the client and the server.

However, before a fully secured path can be established between the client and the server, even using split-terminated sessions, security protocols such as SSL or TLS require handshaking negotiations that involve multiple round-trip communications. Because some of these communications must traverse a WAN, the combined latency of the round-trips can delay the satisfaction of a data request from the client.

SUMMARY

In some embodiments of the invention, a split-terminated secure communication connection is transparently established between a client and a server to enable them to securely issue and respond to client data requests, while also allowing intervening network intermediaries to optimize the client-server communications.

In these embodiments, a first intermediary intercepts a request for a secure communication connection from the client and a second intermediary establishes a secure communication session with the client. The second intermediary possesses a digital certificate enabling it to act as the server (and also possesses a corresponding private key). A client secret used to generate the secure communication session key, a master secret derived from the client secret, and/or the session key itself, are supplied to the first intermediary by the second intermediary.

The first and second intermediaries may also establish between themselves a secure tunnel that traverses a wide area network, or may have established such a link beforehand. The second intermediary may further establish another secure communication session with the server. Thus, data requests can then be securely submitted from the client to first intermediary (protected by a first session key), forwarded from the first intermediary to the second intermediary (protected by a second key), and then delivered to the server (protected by a third key). Responses to data requests can similarly be delivered to the client in the opposite direction.

In some embodiments of the invention, after this secure communication connection terminates (or one or more of the split-terminated sessions ends), the first intermediary intercepts a reuse connection request from the client at the first intermediary. The reuse connection request solicits the use of a handshaking process in which the client secret is reused. Because it already possesses this secret, the first intermediary can establish a new secure communication session with the client without involving the second intermediary or the server.

In some embodiments of the invention, the second intermediary may also supply the first intermediary with a copy of its digital certificate. In these embodiments the first intermediary can respond to a new secure communication connection request from the client, but will forward to the second intermediary a client-key-exchange message (or similar message) encrypted with the public key extracted from the certificate. The second intermediary then returns to the first intermediary the secret derived from the client-key-exchange message.

In some embodiments of the invention, the second intermediary may also supply the first intermediary with the private key corresponding to the certificate. The first intermediary may then establish secure communication sessions with the client without assistance from the second intermediary.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, methods are provided for reducing the latency with which split-terminated secure communication sessions may be established. In these embodiments, a client-server communication connection protected in accordance with a secure communication protocol (e.g., SSL or Secure Sockets Layer, TLS or Transport Layer Security) may be split-terminated in order to enable optimization of the underlying communications (e.g., via transaction acceleration).

Although the methods are described as they may be implemented for SSL or TLS, similar methods for use with other secure communication protocols may be derived from the following discussion without exceeding the scope of the current invention.

Figure 1:
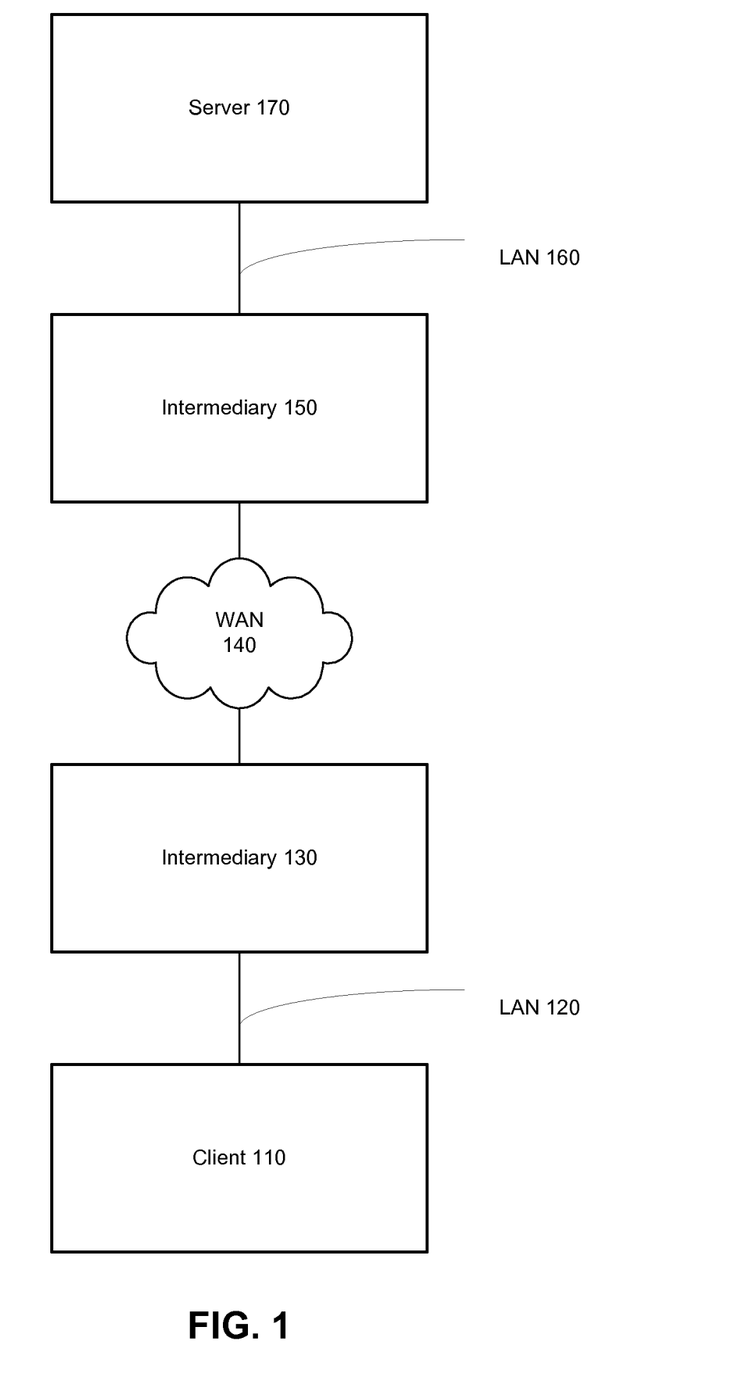
FIG. 1 is a block diagram depicting an environment in which secure communication protocol sessions may be split-terminated, according to some embodiments of the invention.

FIG. 1 illustrates an environment in which split-terminated secure communication sessions may be established in some embodiments of the invention.

In this environment, client 110 communicates with server 170 in a client-server relationship. Intermediaries 130, 150 are situated in the path of communications between client 110 and server 170.

Intermediaries 130, 150 are coupled to WAN (Wide Area Network) 140, while client 110 is coupled to intermediary 130 via LAN (Local Area Network) 120 and server 170 is coupled to intermediary 150 via LAN 160. Thus, intermediary 130 is relatively local to client 110, while intermediary is local to server 170 (e.g., within the same data center).

In the embodiment of FIG. 1, WAN 140 is characterized by relatively high latency and low bandwidth in comparison to LANs 120, 160. In other embodiments of the invention, other types of communication links may be employed. For example, LAN 120 and/or LAN 160 may be WANs.

Intermediary 130 may be termed a "client side intermediary" (or CSI) and intermediary 150 may be termed a "server side intermediary" (or SSI) to reflect their relative positions within environment 100. Although not shown in FIG. 1, additional client side intermediaries may also cooperate with server side intermediary 150, and/or client side intermediary 130 may cooperate with other server side intermediaries.

In one particular embodiment of the invention, intermediaries 130, 150 are Steelhead™ transaction accelerators from Riverbed® Technology, and are configured to optimize communications and applications (e.g., through compression or acceleration). In other embodiments, the intermediaries may be configured to perform other operations in addition to or instead of optimization, such as routing, caching, etc.

All communication traffic between client 110 and server 170 may traverse intermediaries 130, 150 in the illustrated embodiment of the invention. One or both intermediaries may also handle traffic between client 110 and entities other than server 170, and/or traffic between server 170 and other entities. In other embodiments, the client and server may also employ other communication paths that skip one or both of the intermediaries.

Server 170 possesses a valid digital certificate that, among other things, identifies the server and contains the server's public key for use in a PKE (Public Key Encryption) scheme. Server 170 also possesses the corresponding private key. Client 110 has received, verified and trusts a digital certificate of the authority that signed the server's certificate.

Server side intermediary 150 possesses one or more digital certificates issued by a certificate authority trusted by client 110 (e.g., the same authority that issued the server's certificate). At least one of the certificates assigns intermediary 150 the same name that was assigned to server 170 in the server certificate loaded by client 110.

It may be noted that no special application, utility or plug-in need be installed on client 110 in order for it to benefit from embodiments of the invention described herein.

U.S. patent application Ser. No. 11/489,414, entitled "Split Termination for Secure Communication Protocols", describes a method for establishing split-terminated communication sessions between client 110 and server 170 that are secured using SSL, TLS or other appropriate secure communication protocol. Described herein are methods for reducing the latency with which split-terminated secure communication sessions may be established.

In a split-terminated secure communication session, a secure communication connection between two endpoints (e.g., client 110 and server 170) is replaced or simulated by multiple secure communication sessions involving the two endpoints and one or more intermediate entities (e.g., intermediaries 130, 150).

In addition, in the split-terminated sessions the traditional roles of an endpoint in establishing and conducting secure communications are split. For example, the role of negotiating a connection with the other endpoint (client 110) may be handled by one entity, such as intermediary 150. However, the subsequent tasks of encrypting and decrypting communications with the other endpoint are handled elsewhere—such as at intermediary 130.

The manner in which a secure channel between client 110 and server 170 is established using split-terminated secure communication sessions may vary, depending not only on the communication protocol used to secure the sessions, but also on which form of handshaking is performed.

For example, the SSL communication protocol provides a "full" handshake process to be performed when a client opens a first session with a particular server. As part of this process the client provides a secret to be used to generate a symmetric encryption key to encrypt and decrypt the client-server communications. In some special circumstances, the server may also provide a secret (e.g., via a server-key-exchange message).

However, the protocol also provides a "reuse" handshake process that may be implemented when a client that established a session with a server wishes to quickly establish another session. If the client's secret has not expired, the reuse handshake process allows the communicants to rely on their previous level of trust and omit sharing another client secret.

In a traditional computing environment in which the client and server are separated by a WAN such as the Internet, both the full and reuse handshaking processes require multiple round-trip communications between the client and server. Methods described below for establishing split-terminated secure communication sessions allow either or both the full and reuse handshaking processes to be performed with fewer messages having to be exchanged over the WAN, thereby reducing latency experienced by the client.

Figure 2:
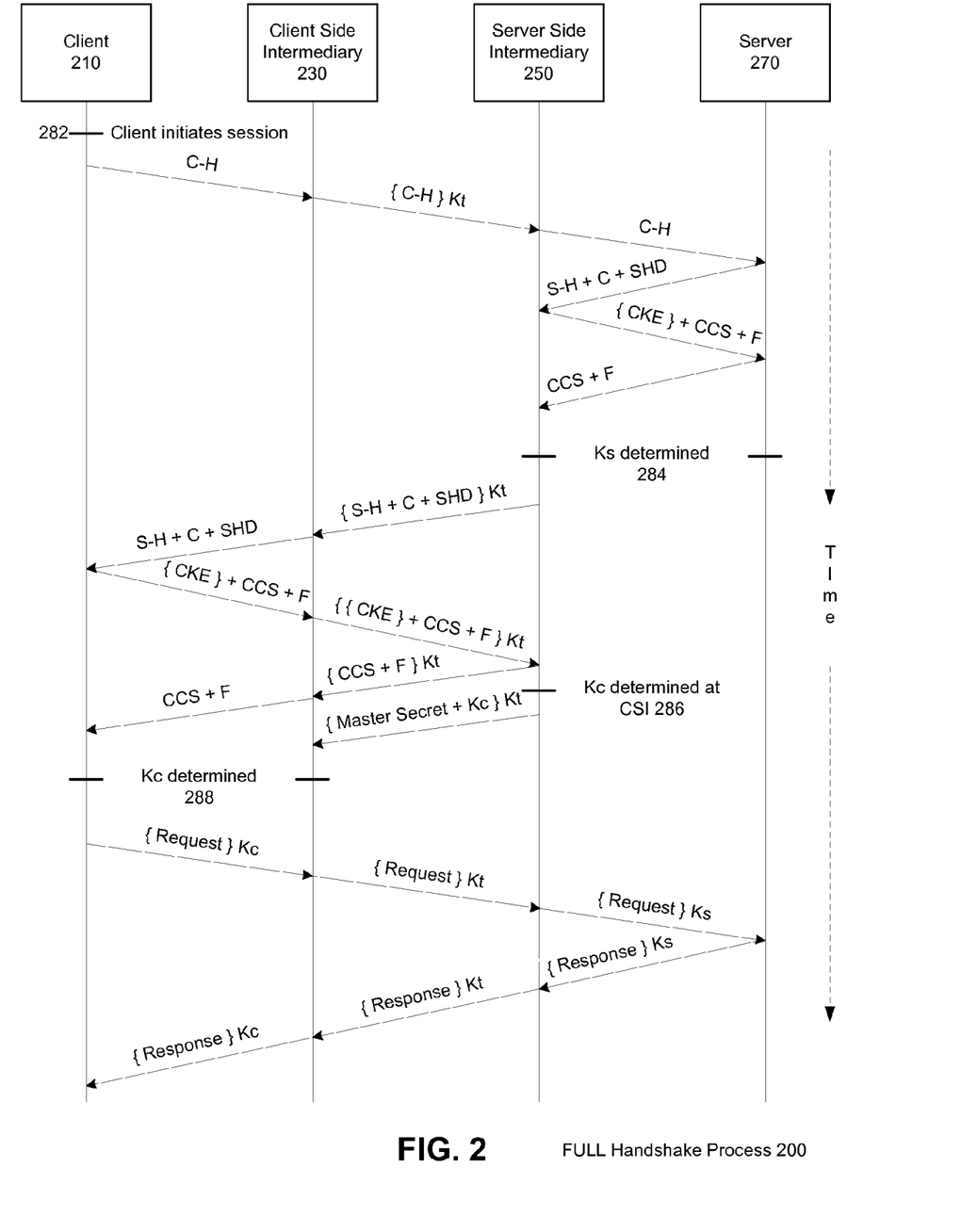
FIG. 2 is a time sequence diagram demonstrating a full handshaking process for establishing a split-terminated secure communication session, according to some embodiments of the invention.

FIG. 2 is a time sequence diagram demonstrating a full SSL handshaking process for establishing a split-terminated secure communication connection between a client and a server, according to some embodiments of the invention.

In one such embodiment, client 210 communicates with client side intermediary (CSI) 230 via a LAN, CSI 230 communicates with server side intermediary (SSI) 250 via a WAN, and SSI 250 communicates with server 270 directly or via another LAN. The directed vectors between these entities represent messages involved in full handshaking process 200.

In this embodiment, at time sequence 282 the client initiates a secure communication session. For purposes of clarity, data exchanges between protocol layers up through the transport protocol layer (e.g., TCP) are omitted so that the discussion can be focused on the SSL handshaking process.

After time sequence 282, or possibly in advance of time sequence 282, CSI 230 and SSI 250 establish a secure channel or tunnel between them, so that communications exchanged across the WAN are protected. In one implementation they employ SSL to establish a symmetric key (with either intermediary acting as client), although in other implementations they may employ a different encryption scheme. A symmetric key used by the CSI and SSI to encrypt/decrypt messages sent via the tunnel is represented herein as Kt.

When the client initiates the secure session, it issues an SSL Client-Hello (C-H) message toward the entity to which it wishes to submit a data request—server 270. The Client-Hello message comprises a client-based seed that will serve as one component in the production of a master secret for use in generating a key for the client's session. The absence of curly braces "{" and "}" around the message indicates that the message is sent as clear text. The Client-Hello message is subsequently encrypted by CSI 230 and forwarded to SSI 250. This message is represented in FIG. 2 as "{C-H} Kt" to indicate that it is encrypted using the intermediaries' key Kt.

SSI 250 decrypts the Client-Hello message (with Kt) but, instead of forwarding the client's hello message to server 270, it generates and issues its own Client-Hello message (C-H). This initiates an SSL handshaking process between the SSI and the server. In an alternative embodiment of the invention, instead of generating a new Client-Hello message, the SSI simply forwards the hello message it received from the CSI.

In response to whichever Client-Hello message the SSI issues, the server sends a clear text message comprising Server-Hello (S-H), a digital Certificate (C) belonging to the server (which includes a public asymmetric key) and Server-Hello-Done (SHD). The Server-Hello message comprises a server-based seed that will be another component in the production of a master secret.

SSI 250 responds with a message signaling Client Key Exchange (CKE) (comprising a secret encrypted with the server's public asymmetric key), Change-Cipher-Specification (CCS) (to specify that the communicants are to start encrypting their communications using a key derived from the master secret) and Finished (F) (which includes an encrypted hash of the communicants' handshaking messages). Server 270 completes the handshaking by signaling CCS and F.

As a result of the handshaking between SSI 250 and server 270, at time sequence 284 both entities possess symmetric key Ks, which will be used to encrypt communications between them. Note that in a communication environment in which the link between the SSI and the server is fully secured and trusted, they may communicate in the clear and this handshaking process may be omitted.

The server side intermediary now proxies for server 270 with regard to the Client-Hello message issued by client 210. Specifically, the SSI responds with Server-Hello (S-H), a certificate (C) identifying SSI 250 with the same name by which client 210 knows server 270, and Server-Hello-Done (SHD). The client side intermediary decrypts this response with Kt and forwards it to the client. The Server-Hello sent by SSI 250 may or may not comprise the Server-Hello received by the SSI from server 270.

Client 210 responds with Client-Key-Exchange (CKE) (including a client secret encrypted with an asymmetric key extracted from the SSI's certificate), Change-Cipher-Specification (CCS) and Finished (F). The CSI encrypts this response with Kt and forwards it to SSI 250. The SSI completes the handshaking by signaling CCS and F, which are decrypted by the CSI and delivered to the client.

It can be seen now that at time sequence 286, server side intermediary 250 has computed symmetric key Kc, which will be used to encrypt communications from and to the client. Client 210 similarly possesses Kc at time sequence 288, at the completion of the handshaking procedure with the SSI.

In the embodiment of the invention depicted in FIG. 2, after SSI 250 computes a master secret and key Kc from the client's secret, client-based seed and server-based seed, it forwards the master secret and key Kc to the client side intermediary via their secure tunnel. Thus, within a short time after the handshaking between the client and the SSI, both the client and CSI 230 are ready to use Kc, because the client can also compute the master secret in the same manner as the SSI.

In one alternative implementation of this embodiment of the invention, SSI 250 forwards only the master secret to CSI 230, and the CSI computes Kc. In other implementations, other security may be applied to protect the client secret and/or master secret in transit between the SSI and the CSI.

In yet another alternative implementation, the master secret (and, possibly key Kc) may be sent from the SSI to the CSI as part of the message conveying Change-Cipher-Specification (CCS) and Finished (F).

As will be seen below, possession of the master secret by client side intermediary 230 can significantly expedite establishment of a follow-on secure communication session that employs the SSL reuse handshake process.

After time sequence 288, the client may now issue data requests toward server 270. A client request is encrypted using Kc and submitted to CSI 230, where it is decrypted using the same key. The request is then encrypted using Kt, forwarded to SSI 250 and decrypted with the same key. Finally, the SSI encrypts the request with Ks and delivers it to server 270 for decryption and subsequent action. The reverse process is then followed to securely deliver the server's response to client 210.

Although not completely shown in FIG. 2, each CKE message is encrypted with the public key of the server or other entity (e.g., SSI 250) to whom the CKE message is directed, and will be decrypted using that entity's corresponding private key.

In FIG. 2, time sequences 282, 284, 286 and 288 are not intended to represent the exact moments the indicated keys become available for use by the corresponding communicants. Such moments may occur before, after or even during the transmission or receipt of messages represented by directed vectors proximate to these time sequences.

Figure 3:
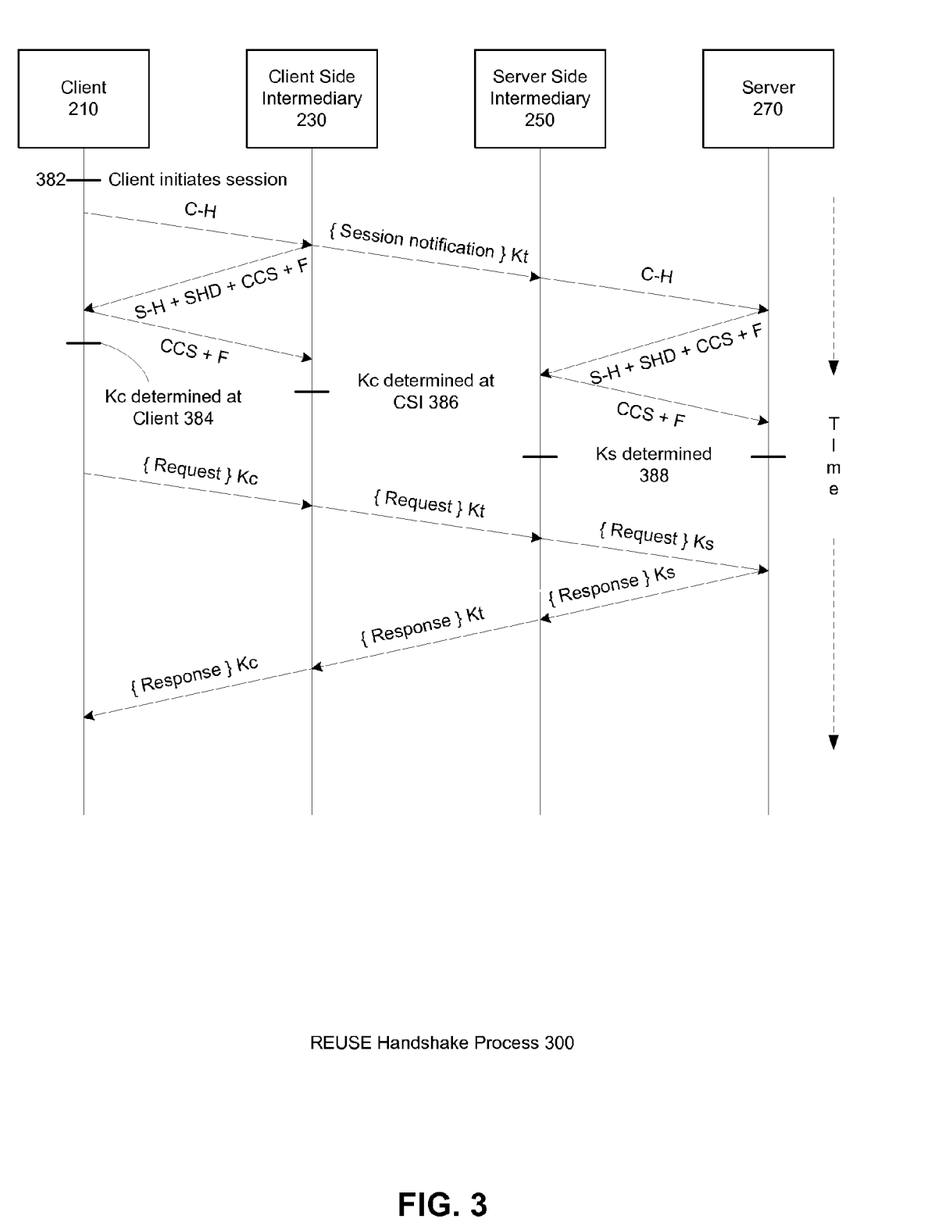
FIG. 3 is a time sequence diagram demonstrating a reuse handshaking process for establishing a split-terminated secure communication session, according to some embodiments of the invention.

FIG. 3 is a time sequence diagram demonstrating a reuse SSL handshaking process for establishing a split-terminated secure communication session between a client and a server with reduced latency, according to some embodiments of the invention.

The illustrated reuse handshake procedure may be performed after a full handshaking has been performed between the client and the server (e.g., as described above in conjunction with FIG. 2), but before the master secret has timed out or expired.

At time sequence 382, client 210 initiates such a follow-on session. As described above, intermediaries 230, 250 have already established a secure tunnel over the WAN connecting them, by agreeing upon a symmetric key Kt, or will do so now.

In accordance with the SSL protocol, the client issues a Client-Hello (C-H) message toward the server, which is intercepted by client side intermediary 230. This Client-Hello message is configured to request application of the reuse handshake procedure. Illustratively, if the master secret has expired, the CSI may act as if a full handshake is to be performed (e.g., as in FIG. 2), or may reject the request.

Assuming the master secret has not timed out, because CSI 230 already possesses that secret from the preceding full SSL handshake, it can immediately act as a proxy for server 270 and return a message signaling Server-Hello (S-H), Server-Hello-Done (SHD), Change-Cipher-Specification (CCS) and Finish (F). The client responds with CCS and F.

Thus, in one embodiment of the invention depicted in FIG. 3, the client can adopt Kc as the key for issuing secure data requests very quickly, at time sequence 384, without awaiting a full round-trip of communication with server 270 or SSI 250. Similarly, CSI 230 adopts key Kc at time sequence 286, and can now receive and act on a data request from the client.

More particularly, the new key Kc is generated from the master secret computed in the previous full handshake, a new client-based seed and a new server-based seed. The new client-based seed is provided to CSI 230 in the Client-Hello message, and the new server-based seed is received by the client as part of the Server-Hello message sent by the CSI. Both entities can then apply the transformation to produce a key block comprising the new key Kc.

Meanwhile, in parallel with responding to the client's Client-Hello message, the client side intermediary forwards a special message or directive to server side intermediary 250 to notify it of the new secure communication session.

In response to notification of the client's request for a communication connection, SSI 250 performs an SSL reuse handshake with server 270, in a manner similar to the reuse handshake performed between client 210 and CSI 230. After this handshaking, at time sequence 388, both the server and the SSI are ready to use Ks to communicate securely. Alternatively, a full handshaking may be performed, or a secure session may not even be established between the SSI and the server.

In the illustrated embodiment of the invention, client 210 can begin issuing secure data requests toward server 270 rapidly, possibly even sooner than it could have if CSI 230 and SSI 250 were not interposed between the client and the server. In particular, in the reuse handshake process promulgated in the SSL protocol specification, the client must await the (S-H+SHD+CCS+F) message(s) to arrive from the server before it can issue a data request.

It may be noted in FIG. 3 that the secure session established between client 210 and CSI 230 is done using a master secret derived from a client secret that the client never provided directly to the CSI.

Any vulnerability of the client or client side intermediary associated with allowing the CSI to know the master secret is substantially mitigated by the fact that the secret is short-lived (e.g., on the order of five minutes). Once the secret expires, the vulnerability is eliminated. Because the CSI only possesses the master secret (and not the server's (or SSI's) private key), it cannot proxy for the server (or the SSI).

In FIG. 3, time sequences 382, 384, 386 and 388 are not intended to represent the exact moments when the indicated keys become available for use. Such moments may occur before, after or even during the transmission or receipt of messages represented by directed vectors proximate to these time sequences.

Network traces have shown that an SSL session opened with a full handshake is, on average, followed by five subsequent SSL sessions opened with reuse handshakes. Therefore, embodiments of the invention described herein can serve to significantly reduce the overall communication latency during consecutive data requests and responses. And, in particular, when transaction accelerators or other intermediaries are interposed in the client-server path of communications, the latency reduction provided by these embodiments of the invention can be even more substantial.

Characteristics of an end-to-end secure communication session as described in the SSL protocol specification (without interception by intermediate entities), and split-terminated secure communication sessions as constructed in an embodiment of the invention in which the methods of FIG. 2 (for full handshaking) and FIG. 3 (for reuse handshaking) are combined, are summarized in TABLE 1. Specifically, TABLE 1 indicates where session termination is performed, where the necessary private key is stored, and whether optimization can be performed on communications exchanged via the indicated type of session.

TABLE 1

| Description | Termination (Full HS) | Termination (Reuse HS) | Private Key Location | Optimize? |
|---|---|---|---|---|
| No Interception | Server | Server | Server | No |
| Migrate Master Secret to CSI | SSI | CSI | SSI | Yes |

TABLE 1 demonstrates that when a secure communication protocol such as SSL is used to secure an end-to-end session between a client and a server, without interception, all termination (for both full and reuse handshaking processes) is performed at the server. Further, the server holds the private asymmetric key that corresponds to the public key used by the client to secure the secret it submits as part of the full handshaking process. And, of course, because no intermediaries are present, no other entity intercepts and can optimize the client-server communications.

In contrast, when a master secret is migrated to a client side intermediary (e.g., CSI 230 of FIG. 2 and FIG. 3), the point of termination of a session depends on the type of handshaking. For full handshaking involving generation of a new master secret, a server side intermediary will act, but for reuse handshaking in which the previous master secret is reused, the client side intermediary will act.

It is also noted that a private key is loaded at the SSI, along with a digital certificate that allows the SSI to proxy for the server for some operations. Finally, the intermediaries can be configured to perform various types of optimization on communications passing between the client and server.

In other embodiments of the invention, enhancements may be made to the method of establishing split-terminated protocol sessions described above in conjunction with FIG. 2.

Figure 4:
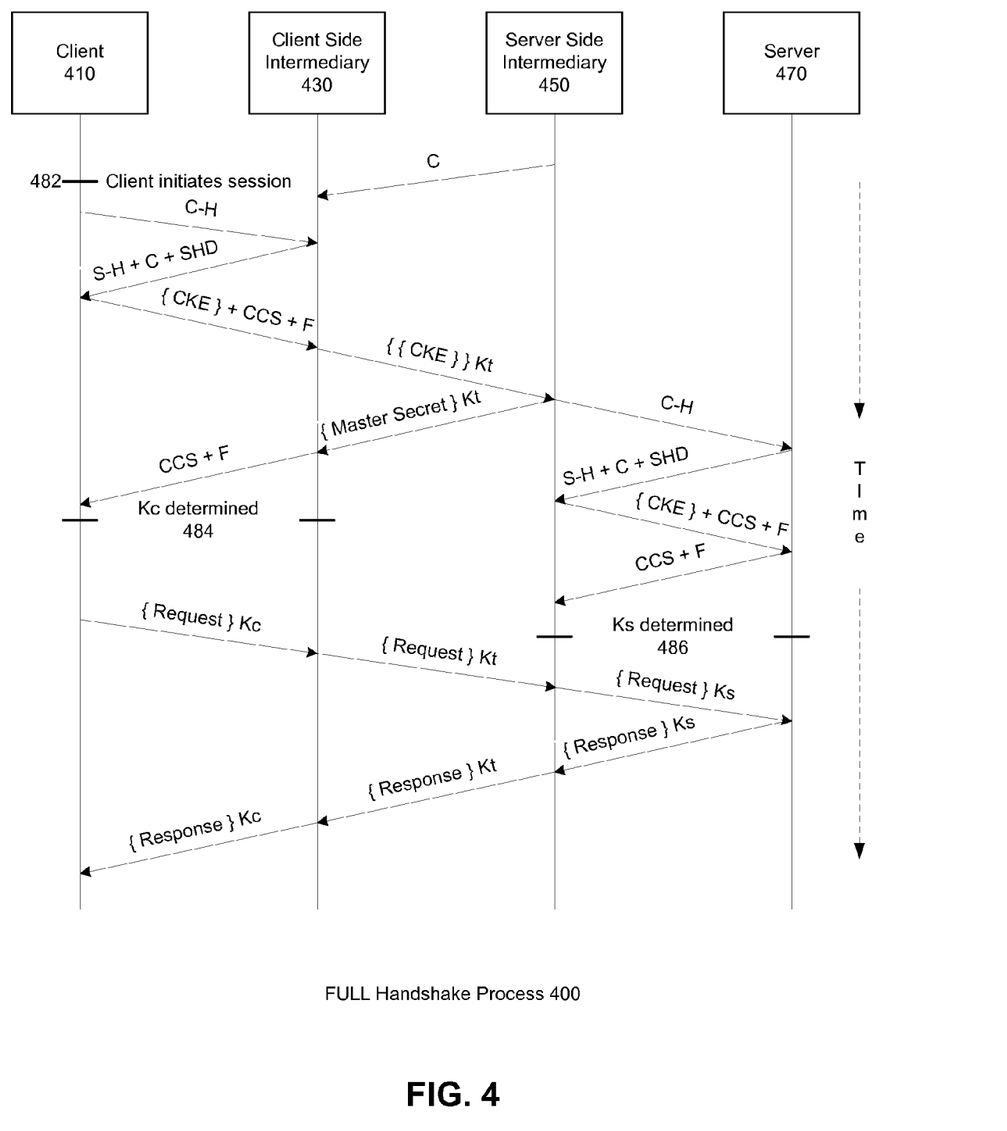
FIG. 4 is a time sequence diagram demonstrating a full handshaking process for establishing a split-terminated secure communication session with reduced latency, according to some embodiments of the invention.

FIG. 4 is a time sequence diagram demonstrating a full SSL handshaking process for establishing a split-terminated secure communication session between a client and a server with reduced latency, according to some embodiments of the invention.

In one such embodiment, a digital certificate assigned to server side intermediary 450 is provided to client side intermediary 430, and may or may not be encrypted with key Kt. Less communication across the WAN separating the SSI and CSI will subsequently be necessary to establish client communication sessions, because the CSI can perform some actions that would have been performed by the SSI (or the server), such as responding to a Client-Hello message. Reference may be made to FIG. 2 to observe differences between these embodiments of the invention.

The SSI's certificate is transmitted to the CSI when client 410 initiates a session at time sequence 482, or at some earlier time.

Upon receipt of the client's Client-Hello (C-H) message, the client side intermediary proxies for the SSI and signals Server-Hello (S-H), the SSI's certificate (C) and Server-Hello-Done (SHD). Client 410 responds with Client-Key-Exchange (CKE), which is encrypted with the public key specified in the SSI's certificate, Change-Cipher-Specification (CCS) and Finish (F).

Because the CSI does not possess the SSI's private key in this embodiment of the invention, it forwards a message comprising CKE to SSI 450. It may or may not further encrypt the signal with the intermediaries' shared key Kt.

The SSI decrypts the CKE message to derive the client's secret, and generates and transmits the master secret to CSI 430 (encrypted with Kt). The CSI then completes the handshake procedure with client 410 by sending Change-Cipher-Specification (CCS) and Finish (F). Thus, at time sequence 484, both client 410 and CSI 430 are ready to use key Kc.

Meanwhile, after the server side intermediary receives the CKE message and learns of the new session, it initiates a secure session with server 470 as described above in conjunction with FIG. 2. Thus, at time sequence 486 both SSI 450 and server 470 are ready to use key Ks. In an alternative implementation, CSI 430 may notify SSI 450 of the new session earlier in the process, such as upon receipt of the Client-Hello message.

After deriving key Kc, the client can issue a data request for conveyance to the server via the intermediaries. The process by which the request and corresponding response are encrypted and decrypted may be similar to the process described above in conjunction with FIG. 2.

Although not completely shown in FIG. 4, each CKE message is encrypted with the public key of the server or other entity (e.g., CSI 430, SSI 450) to whom the CKE message is directed, and will be decrypted using that entity's corresponding private key.

With regard to the full handshaking procedure depicted in FIG. 2, it can be seen that in FIG. 4 one full round-trip across the WAN is eliminated, thereby reducing the overall latency encountered in receiving and responding to a client data request.

TABLE 2 is a version of TABLE 1 updated to reflect characteristics of an embodiment of the invention in which an SSI certificate is migrated to the CSI. In this embodiment, the method of FIG. 4 is used for full handshaking and the method of FIG. 3 is used for reuse handshaking.

TABLE 2

| Description | Termination (Full HS) | Termination (Reuse HS) | Private Key Location | Optimize? |
|---|---|---|---|---|
| No Interception | Server | Server | Server | No |
| Migrate Master Secret to CSI | SSI | CSI | SSI | Yes |
| Migrate SSI Certificate to CSI | CSI | CSI | SSI | Yes |

Figure 5:
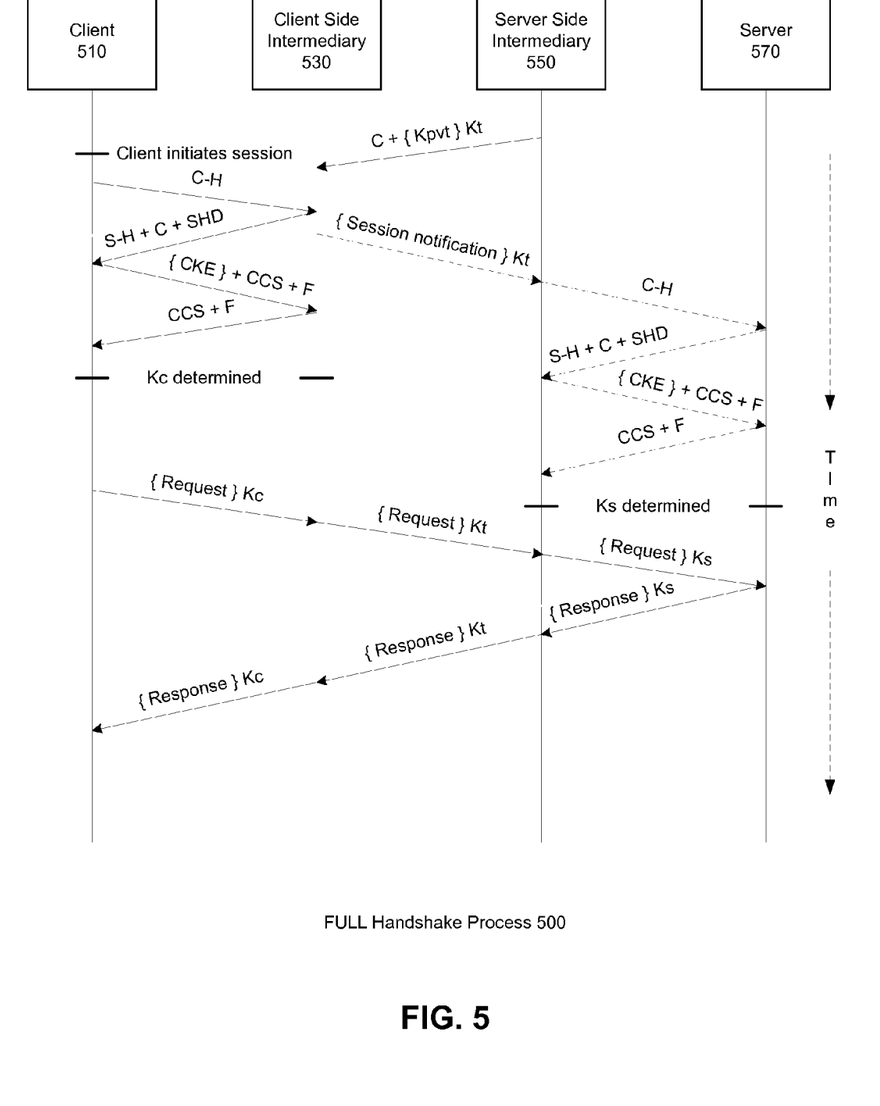
FIG. 5 is a time sequence diagram demonstrating a full handshaking process for establishing a split-terminated secure communication session with further reduced latency, according to some embodiments of the invention.

FIG. 5 is a time sequence diagram demonstrating a full SSL handshaking process for establishing a split-terminated secure communication session between a client and a server with further reduced latency, according to some embodiments of the invention.

In one such embodiment, a digital certificate assigned to server side intermediary 550 is provided to client side intermediary 530, as well as the corresponding private key. The private key is encrypted with Kt; the certificate may or may not be encrypted. Even less communication across the WAN separating the SSI and CSI is now required because the CSI can decrypt the client's CKE message. Reference may be made to FIG. 2 and FIG. 4 to observe differences between these embodiments of the invention.

In particular, it can be seen in FIG. 5 that another full round-trip across the WAN is avoided. However, the client side intermediary may, at some point in the handshaking process with client 510, advise the server side intermediary so that it can initiate a secure session with server 570.

Alternatively, if communications between SSI 550 and the server need not be protected, the SSI need not be advised of the new secure session until a data request from the client is forwarded from CSI 530.

Although not completely shown in FIG. 5, each CKE message is encrypted with the public key of the server or other entity (e.g., CSI 530, SSI 550) to whom the CKE message is directed, and will be decrypted using that entity's corresponding private key.

Illustratively, in the embodiment of the invention depicted in FIG. 5, the private key may be protected on the client side intermediary by restricting its storage to transient memory. By preventing it from being written to any permanent storage device, its vulnerability is limited.

TABLE 3 is a version of TABLE 2 that has been updated to reflect characteristics of an embodiment of the invention in which an SSI certificate and corresponding private key are migrated to the CSI. In this embodiment, the method of FIG. 5 is used for full handshaking and the method of FIG. 3 is used for reuse handshaking.

TABLE 3

| Description | Termination (Full HS) | Termination (Reuse HS) | Private Key Location | Optimize? |
|---|---|---|---|---|
| No Interception | Server | Server | Server | No |
| Migrate Master Secret to CSI | SSI | CSI | SSI | Yes |
| Migrate SSI Certificate to CSI | CSI | CSI | SSI | Yes |
| Migrate Private Key to CSI | CSI | CSI | CSI (Transient) | Yes |

TABLE 4 reports the latency advantages of methods of the invention described herein, wherein either one or more of a client secret, SSI certificate and private key are migrated to a client side intermediary. The measure of latency employed in TABLE 4 is expressed in round-trip-times (RTT) across the WAN separating the network intermediaries because the time needed to convey a communication between the communication endpoints is dominated by the latency of the WAN.

TABLE 4

| Description | Full HS WAN RTTs | Reuse HS WAN RTTs | Total RTTs for typical browser interaction: 1 full HS + 5 reuse HS |
|---|---|---|---|
| No Interception | 3 | 2 | 13 |
| Migrate Master Secret to CSI | 3 | 1 | 8 |
| Migrate SSI Certificate to CSI | 2 | 1 | 7 |
| Migrate Private Key to CSI | 1 | 1 | 6 |

TABLE 4 reveals that in the control case in which no interception is performed (i.e., the client establishes secure sessions directly with the server, with no split-terminated sessions), three round-trip-times across the WAN are needed to complete a single session (using a full handshake process) involving a single request (e.g., an HTTPS GET) and one response. Two round-trips are needed to complete a reuse session (with a reuse handshake process).

With no interception, for a typical browser pattern of interaction with the server, defined as involving a first secure session requiring full handshaking, followed by five follow-on secure sessions implementing reuse handshaking, a total of 13 WAN RTTs is required.

It can be seen that the methods of split-termination of secure protocol communication sessions described herein permit significant reductions in latency, especially for the typical pattern of browser interaction. Even if a browser's pattern of interaction is less efficient (i.e., fewer reuse sessions following a full handshaking process), overall latency can still be reduced.

The optimization of communications that the intermediaries provide may reduce end users' latency even further, but are not reflected in TABLE 4. However, it is assumed that latency across LANs is negligible in comparison to WAN latency.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of establishing a split-terminated secure communication connection between a client computing device and a server computing device, the method comprising:

at a client-side intermediary interposed in a communication path between the client and a network coupling the client to the server;

receiving from a server-side intermediary a certificate issued in a name of the server;

intercepting a request from the client for a secure communication connection with the server;

forwarding to the server-side intermediary a client-key exchange message received from the client; and establishing a secure client-side communication session between the client and the client-side intermediary; and at the server-side intermediary, interposed between the network and the server:

receiving the forwarded client-key-exchange message;

calculating the master secret from a client secret extracted from the client-key exchange message;

transmitting the master secret to the client-side intermediary; and establishing a secure server-side communication session with the server;

wherein the split-terminated secure communication connection comprises the secure client-side communication session, the secure server-side communication session and a communication connection between the client-side intermediary and the server-side intermediary; and wherein the split-terminated secure communication connection is established with no more than three communications exchanged across the network, the three communications including:

the certificate transmitted from the server-side intermediary to the client-side intermediary;

the client-key exchange message transmitted from the client-side intermediary to the server-side intermediary; and the master secret transmitted from the server-side intermediary to the client-side intermediary.

2. The method of claim 1, further comprising:
at the client-side intermediary:
receiving a secure data request from the client;
decrypting the secure data request with a first key associated with the secure client-side communication session;
encrypting the data request with a second key associated with the communication connection between the client-side intermediary and the server-side intermediary; and
forwarding the data request to the server-side intermediary; and
at the server-side intermediary:
decrypting the data request with the second key; and
submitting the data request to the server.

3. The method of claim 2, wherein said submitting the data request to the server comprises:
encrypting the data request with a third key associated with the secure server-side communication session.

4. The method of claim 1, wherein:
the client and the client-side intermediary are coupled by a first local communication link;
the server and the server-side intermediary are coupled by a second local communication link; and
the client-side intermediary and the server-side intermediary are coupled by the network.

5. The method of claim 1, further comprising, after termination of the secure client-side communication session:
intercepting a reuse connection request from the client at the client-side intermediary, wherein the reuse connection request attempts to reuse the master secret; and
establishing a second secure client-side communication session between the client and the client-side intermediary.

6. The method of claim 5, wherein the second secure client-side communication session is established without participation by the server-side intermediary and without participation by the server.

7. A non-transitory computer-readable medium storing instructions that, when executed by a computer, interposed in a communication path between a client computing device and a network coupling the client computing device to a server computing device, cause the computer to perform a method of establishing a split-terminated secure communication connection between the client computing device and the server computing device, the method comprising:
receiving from a server-side intermediary a certificate issued in a name of the server;
intercepting a request from the client for a secure communication connection with the server;
forwarding to the server-side intermediary a client-key-exchange message received from the client;
receiving from the server-side intermediary a master secret calculated from a client secret extracted from the client-key-exchange message; and
establishing a secure client-side communication session between the client and the computer; and
wherein the split-terminated secure communication connection comprises the secure client-side communication session, a secure server-side communication session established between the server-side intermediary and the server, and a communication connection between the computer and the server-side intermediary; and
wherein the split-terminated secure communication connection is established with no more than three communications exchanged across the network, the three communications including:
the certificate transmitted from the server-side intermediary to the computer;
the client-key-exchange message transmitted from the computer to the server-side intermediary; and
the master secret transmitted from the server-side intermediary to the computer.

8. A method of establishing a secure communication channel between a client computing device and a server computing device, the method comprising:
at a client-side intermediary interposed in a communication path between the client and a network separating the client and the server:
receiving from a server-side intermediary a certificate issued in a name of the server, and a corresponding private cryptographic key;
intercepting a request for a secure communication connection directed to the server;
notifying the server-side intermediary of the intercepted request;
during a secure protocol handshaking process with the client, accepting a client-key-exchange message comprising a client secret for generating a key;
decrypting the client secret with the private cryptographic key;
calculating a master secret from the client secret; and
establishing a secure client-side communication session with the client; and
at the server-side intermediary, interposed between the network and the server:
receiving the notification of the intercepted request; and
establishing a secure server-side communication session with the server;
wherein the secure communication channel between the client and the server comprises the secure client-side communication session, the secure server-side communication session and a communication connection between the client-side intermediary and the server-side intermediary; and
wherein the secure communication channel between the client and the server is established with only one round-trip of communications transiting the network, the round-trip of communications including:
the transmission of the certificate and the private cryptographic key from the server-side intermediary to the client-side intermediary; and
said notifying of the server-side intermediary, by the client-side intermediary, of the intercepted request.

9. The method of claim 8, further comprising, after termination of the secure client-side communication session:

at the client-side intermediary, intercepting a reuse connection request directed to the server from the client, wherein the reuse connection request attempts to reuse the master secret; and establishing a second secure client-side communication session between the client and the client-side intermediary.

10. A non-transitory computer-readable medium storing instructions that, when executed by a computer interposed in a communication path between a client computing device and a network separating the client computing device and a server computing device, cause the computer to perform a method of facilitating establishment of a secure communication channel between the client computing device and the server computing device, the method comprising:

receiving from a server-side intermediary a certificate issued in a name of the server, and a corresponding private cryptographic key;

intercepting a request for a secure communication connection directed to the server;

notifying the server-side intermediary of the intercepted request;

during a secure protocol handshaking process with the client, accepting a client-key-exchange message comprising a client secret for generating a key;

decrypting the client secret with the private cryptographic key;

calculating a master secret from the client secret; and establishing a secure client-side communication session with the client;

wherein the secure communication channel between the client and the server comprises the secure client-side communication session, a secure server-side communication session established between the server-side intermediary and the server, and a communication connection between the computer and the server-side intermediary; and wherein the secure communication channel between the client and the server is established with only one round-trip of communications across the network, the round-trip of communication including:

the transmission of the certificate and the private cryptographic key from the server-side intermediary to the computer; and said notifying of the server-side intermediary, by the computer, of the intercepted request.

11. A system for facilitating a split-terminated secure communication connection between a client computing device and a server computing device, the system comprising:

a server-side intermediary interposed between the server and a network coupling the client and the server, the server-side intermediary comprising:

a certificate issued in a name of the server;

a first processor; and a first storage medium storing instructions that, when executed by the first processor, cause the server-side intermediary to perform a method comprising:

transmitting the certificate to a client-side intermediary interposed between the client and the network;

decrypting a client-key-exchange message received from the client-side intermediary, with a private cryptographic key corresponding to the certificate;

calculating a master secret from a client secret extracted from the decrypted client-key-exchange message;

transmitting the master secret to the client-side intermediary; and establishing a first secure communication with the server; and the client-side intermediary, comprising:

a second processor; and a second storage medium storing instructions that, when executed by the second processor, cause the client-side intermediary to perform a method comprising:

intercepting a request from the client for a secure communication connection with the server;

forwarding to the server-side intermediary the client-key-exchange message received from the client; and establishing a second secure communication session with the client;

wherein the split-terminated secure communication connection comprises the first communication session, the second secure communication session and a communication connection between the server-side intermediary and the client-side intermediary; and wherein the split-terminated secure communication connection is established with no more than three communications exchange across the network, the three communications including:

the certificate transmitted from the server-side intermediary to the client-side intermediary;

the client-key-exchange message transmitted form the client-side intermediary to the server-side intermediary; and the master secret transmitted from the server-side intermediary to the client-side intermediary.

12. A system for facilitating a secure communication channel between a client computing device and a server computing device, the system comprising:

a server-side intermediary interposed between the server and a network separating the client and the server, the server-side intermediary comprising:

a certificate issued in a name of the server;

a first processor; and a first storage medium storing instructions that, when executed by the first processor, cause the server-side intermediary to perform a method comprising:

transmitting the certificate and a corresponding private cryptographic key to a client-side intermediary interposed between the client and the network; and establishing a first secure communication session with the server in response to a notification from the client-side intermediary; and the client-side intermediary, comprising:

a second processor; and a second storage medium storing instructions that, when executed by the second processor, cause the client-side intermediary to perform a method comprising:

intercepting a request for a secure client-server communication connection, directed from the client toward the server;

notifying the server-side intermediary of the intercepted request;

decrypting, with the private cryptographic key, a client secret received from the client;

calculating master secret from the client secret; and establishing a second secure communication session with the client;

wherein the secure communication channel comprises the first secure communication session, the second secure communication session and a communication connection between the server-side intermediary and the client-side intermediary; and wherein the secure communication channel is established with only one round-trip of communications across the network, the round-trip of communications including:
   said transmission of the certificate and the private cryptographic key from the server-side intermediary to the client-side intermediary; and
   said notifying of the server-side intermediary, by the client-side intermediary, of the intercepted request.

* * * * *